(12) United States Patent
Fritz et al.

(10) Patent No.: US 7,878,172 B2
(45) Date of Patent: Feb. 1, 2011

(54) INTAKE CHANNELS FOR INTERNAL COMBUSTION ENGINES

(75) Inventors: Jassin Fritz, Munich (DE); Rodrigo Rodriguez Erdmenger, Bavaria (DE)

(73) Assignee: General Electric Company, Scheneclady, NY (US)

( * ) Notice: Subject to any disclaimer, the term of this patent is extended or adjusted under 35 U.S.C. 154(b) by 0 days.

(21) Appl. No.: 12/477,305

(22) Filed: Jun. 3, 2009

(65) Prior Publication Data
US 2009/0301432 A1 Dec. 10, 2009

(30) Foreign Application Priority Data
Jun. 6, 2008 (EP) ................... 08157801

(51) Int. Cl.
F02B 31/08 (2006.01)
(52) U.S. Cl. ..................... 123/306; 123/308
(58) Field of Classification Search ............... 123/302, 123/306, 308, 590, 592
See application file for complete search history.

(56) References Cited

U.S. PATENT DOCUMENTS

| | | | | |
|---|---|---|---|---|
| 3,868,940 | A | * 3/1975 | Kirchweger | ........... 123/188.14 |
| 4,207,854 | A | 6/1980 | Alford et al. | |
| 4,432,312 | A | 2/1984 | Klomp et al. | |
| 4,465,034 | A | 8/1984 | Tsutsumi | |
| 4,699,104 | A | 10/1987 | Okumura | |
| 4,744,342 | A | * 5/1988 | Ochiai | ........................ 123/308 |
| 4,745,890 | A | 5/1988 | Wyczalek et al. | |
| 4,760,821 | A | * 8/1988 | Aupor et al. | ................. 123/308 |
| 4,909,210 | A | * 3/1990 | Shimada et al. | ............. 123/308 |
| 5,165,374 | A | * 11/1992 | Chapman et al. | ............. 123/308 |
| 5,291,865 | A | * 3/1994 | Sasaki | ........................ 123/298 |
| 5,357,925 | A | * 10/1994 | Sasaki | ........................ 123/298 |
| 5,359,972 | A | * 11/1994 | Isaka | ........................ 123/308 |
| 5,435,283 | A | 7/1995 | Zehr | |
| 5,463,995 | A | * 11/1995 | Sakai et al. | .................. 123/432 |
| 5,479,889 | A | * 1/1996 | Sato et al. | .................... 123/308 |
| 5,592,917 | A | * 1/1997 | Kim | ........................ 123/308 |
| 5,704,324 | A | 1/1998 | Ichinose et al. | |
| 5,765,525 | A | * 6/1998 | Ma | .............. 123/308 |
| 5,855,194 | A | * 1/1999 | Okumura et al. | ............ 123/308 |
| 5,884,598 | A | * 3/1999 | Kawashima | .............. 123/188.8 |
| 5,979,401 | A | * 11/1999 | Hickey | ........................ 123/306 |

(Continued)

FOREIGN PATENT DOCUMENTS

DE 2035939 B1 2/1986

(Continued)

*Primary Examiner*—Hai H Huynh
(74) *Attorney, Agent, or Firm*—Global Patent Operation; Douglas D. Zhang

(57) ABSTRACT

Various embodiments of the invention relate to an intake channel of an internal combustion engine in which an adjustable position guide vane is configured to modify the velocity distribution inside the intake channel in order to vary the mean swirl number generated by the channel. The intake channel may comprise a combination of two or more ports, which can be helical or tangential, depending on their shape. By varying the velocity distribution inside the intake channel it is possible to vary the mean swirl number in an internal combustion engine. Contrary to existing systems to vary the swirl in internal combustion engines, the invention proposed does not require the separation of both ports inside the intake channel by a wall in order to achieve a variation in the swirl.

20 Claims, 5 Drawing Sheets

U.S. PATENT DOCUMENTS

| | | | |
|---|---|---|---|
| 6,003,485 A * | 12/1999 | Kawashima et al. | 123/188.14 |
| 6,047,473 A * | 4/2000 | Brignall et al. | 29/888.06 |
| 6,055,727 A * | 5/2000 | Brignall et al. | 29/888.06 |
| 6,213,090 B1 * | 4/2001 | Tamai et al. | 123/308 |
| 6,250,281 B1 * | 6/2001 | Takii et al. | 123/308 |
| 6,526,940 B2 * | 3/2003 | Ichikawa | 123/308 |
| 6,553,959 B2 * | 4/2003 | Xu et al. | 123/295 |
| 6,598,585 B2 | 7/2003 | Schweinzer et al. | |
| 6,799,551 B2 * | 10/2004 | Nakakita et al. | 123/295 |
| 7,322,191 B2 * | 1/2008 | Tonetti et al. | 60/605.1 |
| 7,690,200 B2 * | 4/2010 | Tonetti et al. | 60/605.1 |
| 7,707,989 B2 * | 5/2010 | Andou et al. | 123/306 |
| 2004/0244767 A1 | 12/2004 | Nishii et al. | |

FOREIGN PATENT DOCUMENTS

| | | |
|---|---|---|
| EP | 0235288 B1 | 7/1992 |
| FR | 2879673 A | 6/2006 |
| JP | 61104119 A | 5/1986 |
| JP | 10-339150 | * 12/1998 |

* cited by examiner

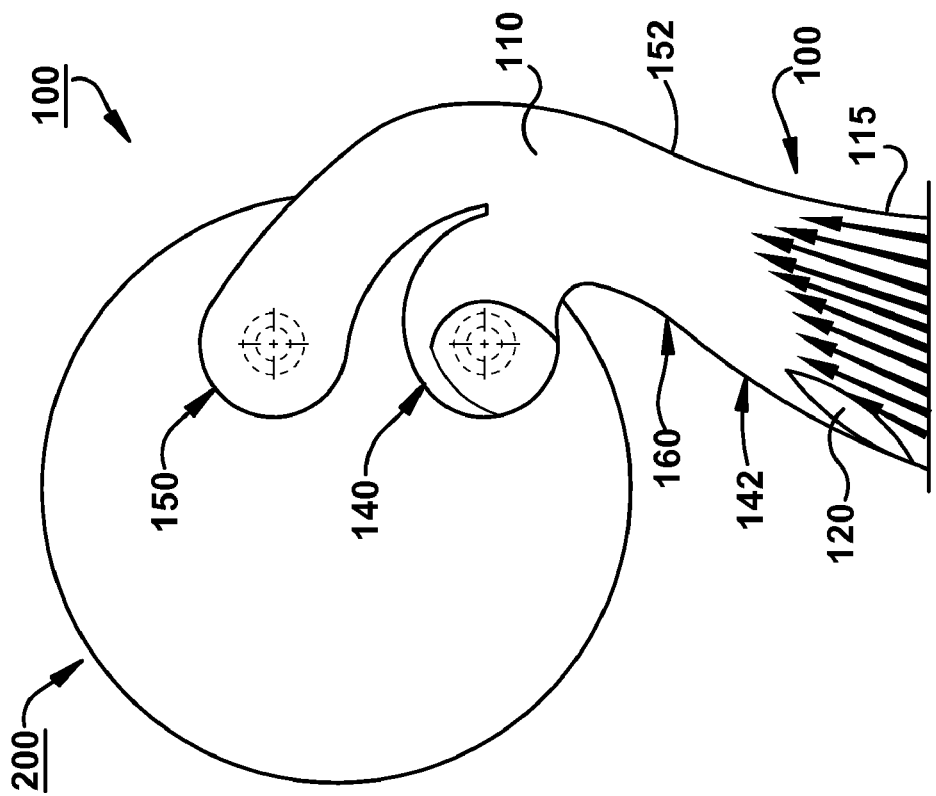
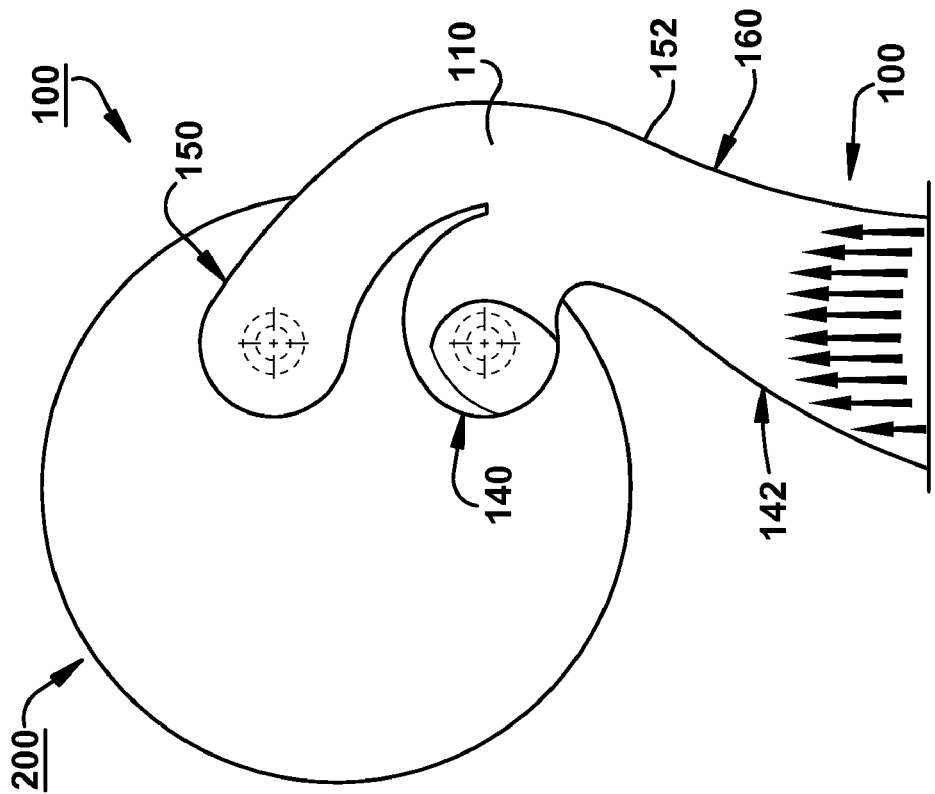

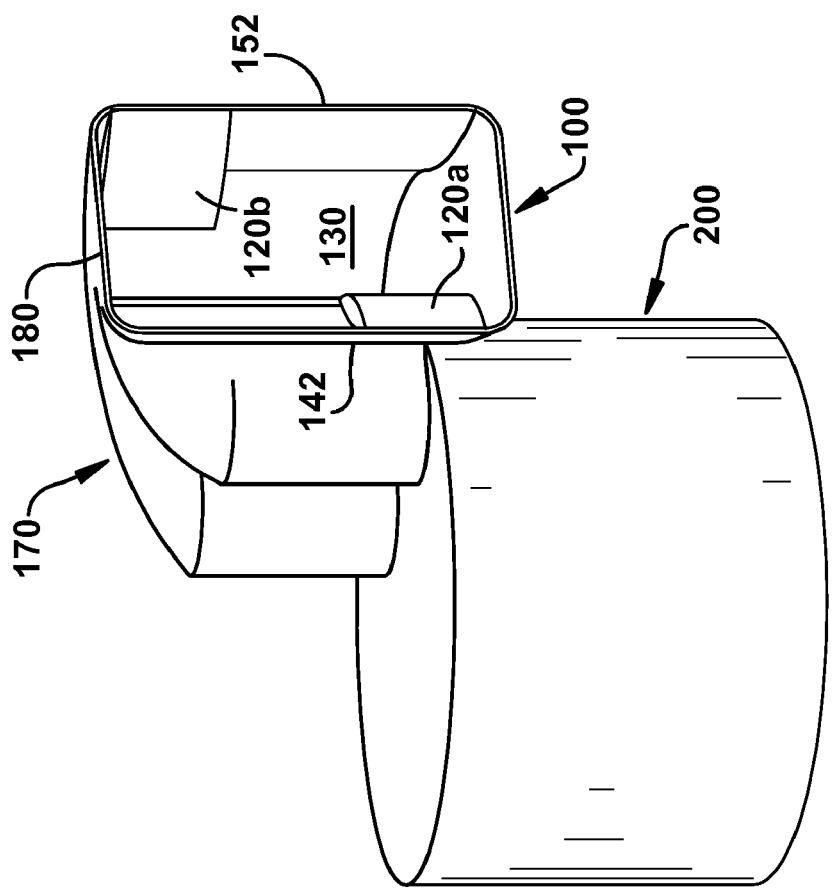
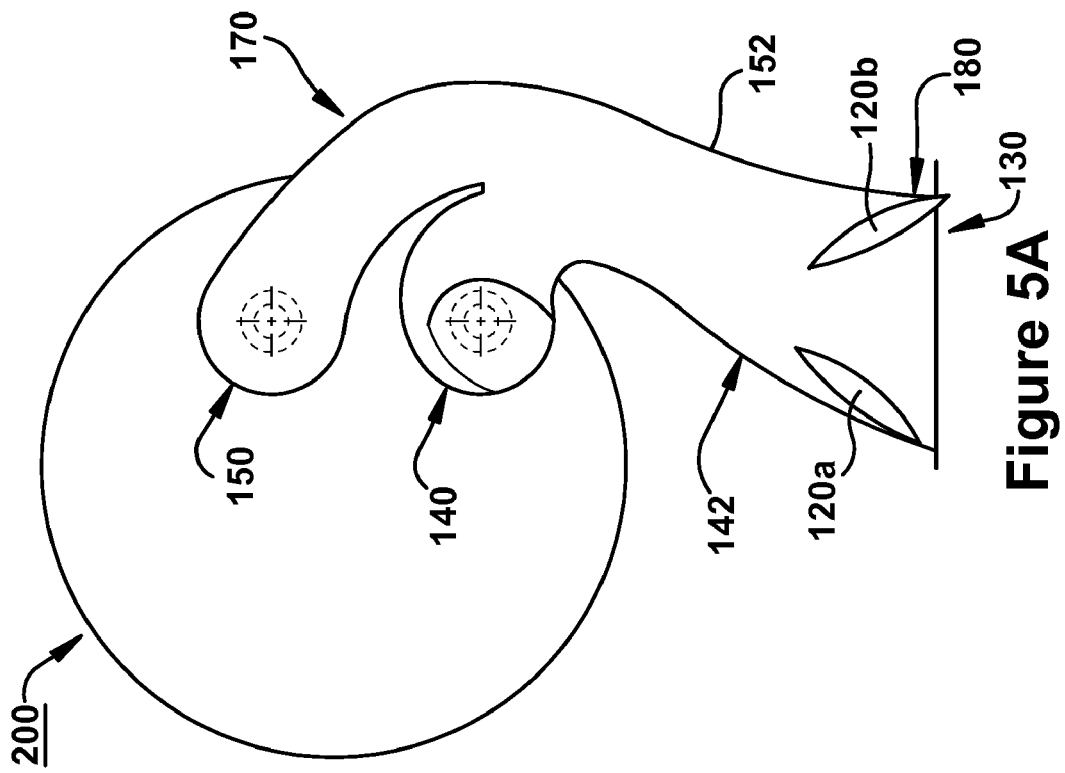
Figure 5B
Figure 5A

INTAKE CHANNELS FOR INTERNAL COMBUSTION ENGINES

FIELD

The present invention relates generally to intake channels for internal combustion engines. In particular, the present invention relates to intake channels for internal combustion engines, which can be used to vary the swirl level in engine cylinders.

BACKGROUND

Numerous devices and methods have been proposed over many years to provide swirl in the combustion chambers of internal combustion engines to promote fast and efficient combustion of a fuel/air supply mixture. These devices and methods include the provision of engine intake channels that can provide a variable swirl level in engine cylinders.

However, whilst slow but steady improvement has been made in the technology available to provide variable swirl levels in engine cylinders over the last few decades, there always exists a need to provide improved methods and devices to further improve charge movement in engine cylinders in order to enhance fuel economy and optimise engine power performance.

SUMMARY OF THE INVENTION

According to a first aspect of the invention, there is provided an intake channel for an internal combustion engine. The proposed intake channel comprises an adjustable position guide vane. The guide vane is configured to modify a velocity distribution within the intake channel so as to vary the mean swirl level in one or more cylinders of an engine.

According to a second aspect of the invention, there is provided an adapter device configured to fit between an engine manifold and an intake channel of an engine. The adapter device comprises a housing and an adjustable position guide vane positioned in the housing. The guide vane is configured to modify a flow velocity distribution within the intake channel so as to vary the mean swirl level in one or more cylinders of the engine.

Achieving an optimum swirl level in an internal combustion engine is important since it influences the turbulence intensity inside the cylinders, as well as changes the large scale mixing and thereby may lead to an improved combustion process for the engine.

Various aspects and embodiments of the invention provide an accurately controllable guide vane that can be operated to vary the mean swirl level in one or more engine cylinders. The precision and/or placement of such guide vanes allows for setting a mean swirl number to provide improved combustion which may lead, for example, to an enhanced fuel economy and/or optimised engine power performance.

Moreover, various embodiments of the present invention can be retro-fitted to existing conventional engine intake channels in order to add the aforementioned benefits to conventional engines without the need for such conventional engines to be substantially redesigned or reworked.

BRIEF DESCRIPTION OF THE DRAWINGS

Various aspects and embodiments of the present invention will now be described in connection with the accompanying drawings, in which:

FIGS. 4A and 4B schematically show the working principle of various embodiments of the present invention;

FIG. 5A shows a schematic in a plan view of a further embodiment of the present invention comprising an adapter device in which two vanes are mounted in different positions to vary the flow profile in the intake channel; and FIG. 5B shows a schematic in a perspective view of the further embodiment of FIG. 5A.

DETAILED DESCRIPTION

Figure 1:
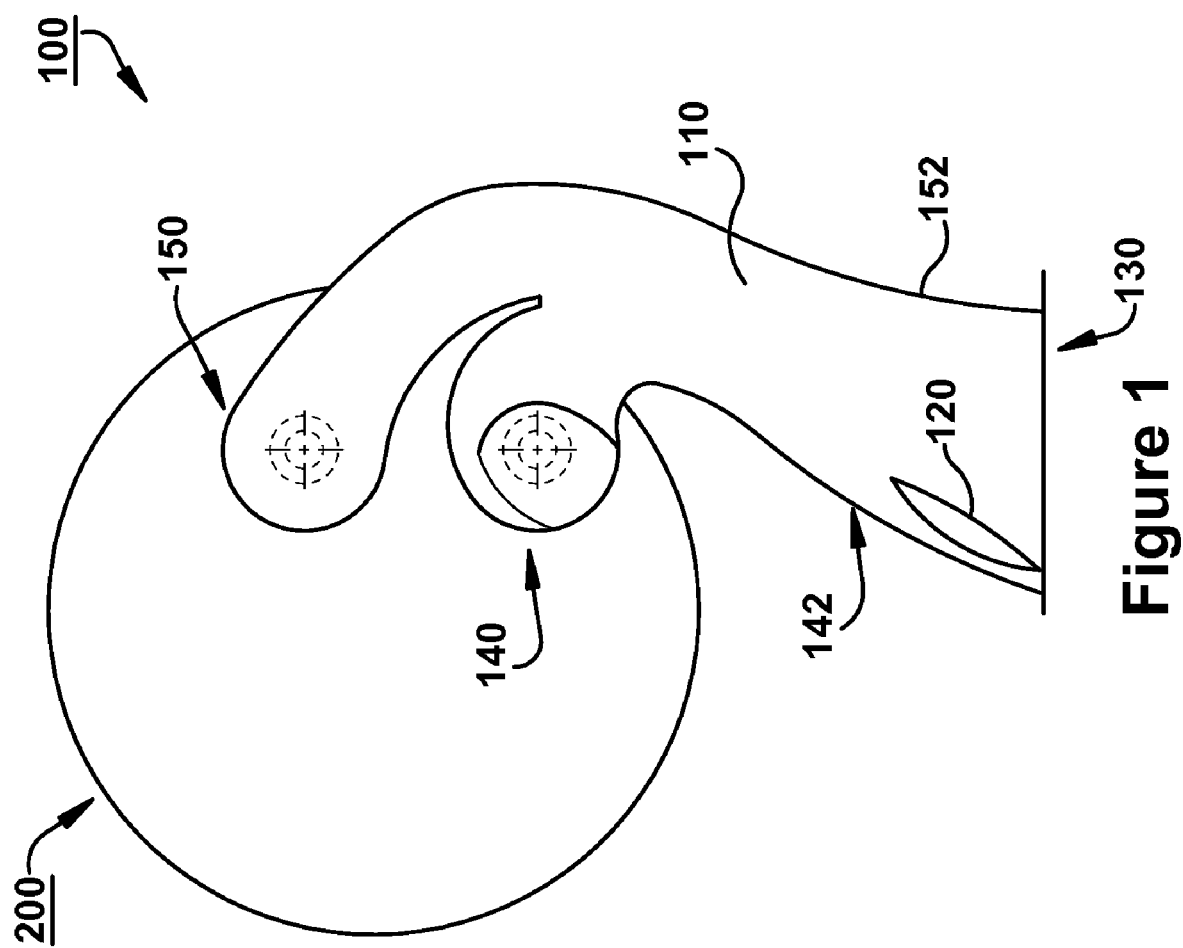
FIG. 1 shows an intake channel for an internal combustion engine according to an embodiment of the present invention in plan view.

FIG. 1 shows an intake channel 100 for an internal combustion engine in plan view. The intake channel 100 a helical port 140 and a tangential port 150 distal from an intake channel inlet 130. The intake channel inlet 130 directs the engine flow into the helical port 140 and the tangential port 150.

An adjustable position guide vane 120 is positioned in the intake channel 100. The guide vane 120 is configured to modify the velocity distribution within the intake channel 100 so as to vary the mean swirl level in a cylinder 200 of an internal combustion engine (not shown).

Within the (non-bifurcated) intake channel 100 the flow is distributed to the helical port 140 and the tangential port 150. The intake channel 100 does not necessarily need to be split internally. The velocity distribution of the flow in the intake channel 100 may be controlled using one or several guide vanes 120. This enables a greater degree of control to be exercised over the velocity, and further provides the possibility to minimize the pressure drop and thus to maximize the discharge coefficients for various embodiments of the invention, since a purpose of the guide vane 200 is not to block the flow through one or more of the ports 140, 150 (as certain conventional systems do), but to modify the velocity flow profile inside the intake channel 100.

The material for the guide vane 120 can be anything that can withstand the operating environment of the engine: e.g. aluminium, plastic, carbon fibre, etc. The size and shape of the vane 120 is defined according to the specific engine application.

The mean swirl number $D_m$, which defines a mass weighed average of the swirl in the cylinder, is defined as:

$$D_m = \frac{\sum D_i \cdot \dot{m} \cdot \Delta t}{\sum \dot{m} \cdot \Delta t} \qquad \text{-Equation (1)}$$

where $D_i$ is the swirl number for a given valve lift, $\dot{m}$ is the actual mass flow and $\Delta t$ represents a time interval.

In various embodiments, a blend ring may also be used to direct the flow and to increase the flow velocity at the exit of the tangential port 150 in order to increase the mean swirl number. Additionally, using various embodiments of the present invention, different swirl levels can be provided to achieve the optimum mean swirl number required by different fuels with the same intake channel design. The fine tuning of the swirl number can be done for each cylinder individually.

For example, different fuels may have different burning velocities and require different turbulence levels to achieve an optimum combustion behaviour. By enabling variations of the swirl level in an engine, it is possible to select the needed mean swirl number for a given type of fuel, without the need to modify the intake channel design.

Figure 2:
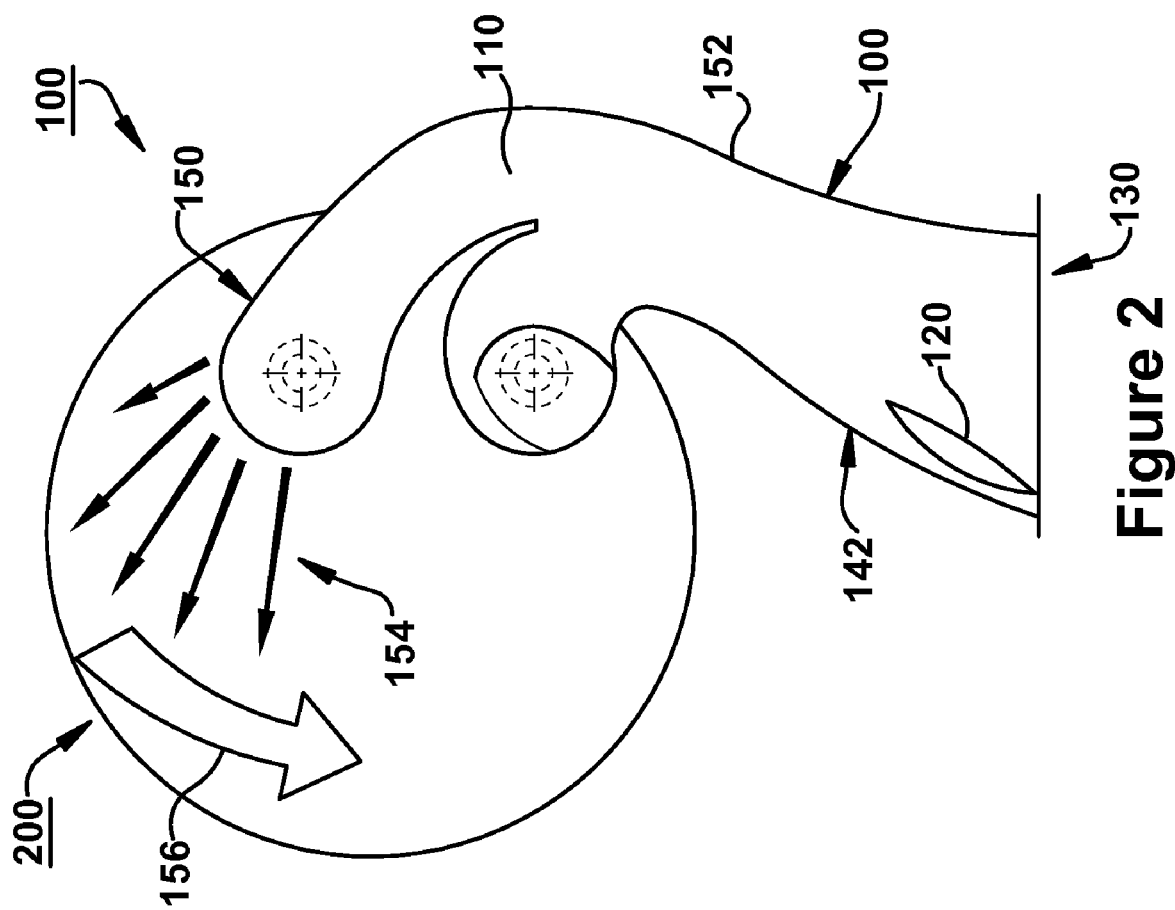
FIG. 2 shows a schematic view of the flow coming from a tangential port of the intake channel of FIG. 1.

FIG. 2 shows a schematic of the flow distribution entering the cylinder 200 from the tangential port 150 of the intake channel 100 of FIG. 1. In operation, the flow entering through the tangential port 150 in the direction of arrows 154 produces swirl 156 by the interaction of the flow with the cylinder walls. The mean swirl 156 in the cylinder can be varied by adjusting the position of the guide vane 120.

Figure 3:
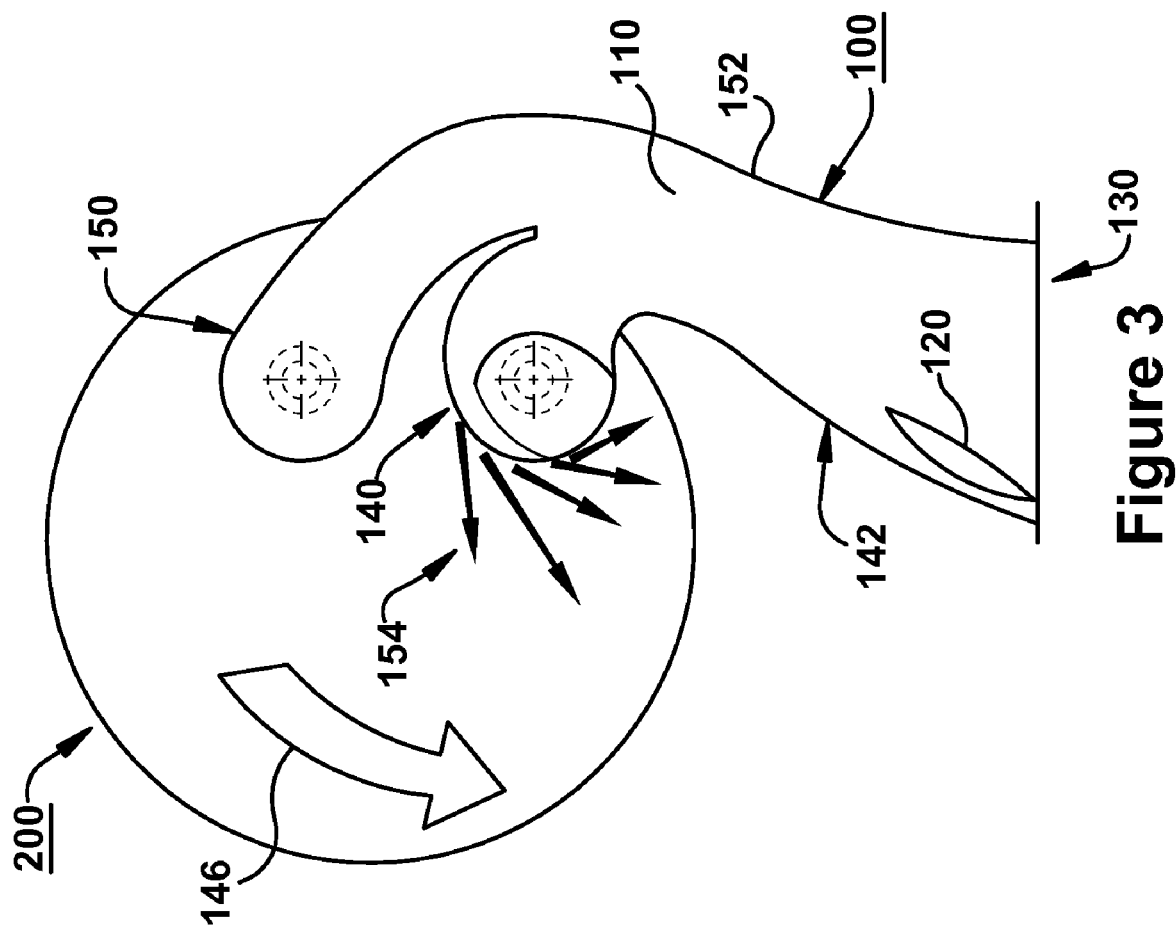
FIG. 3 shows a schematic view of the flow coming from a helical port of the intake channel of FIG. 1.

FIG. 3 shows a schematic of the flow distribution entering the cylinder 200 from the helical port 140 of the intake channel 100 of FIG. 1. In operation, the flow entering through the helical port 140 in the direction of arrows 154 produces swirl inside the port itself. The swirl 146 is generated by the induction of a tangential velocity component about the direction of the cylinder axis. The degree of swirl 146 in the cylinder 200 can also be varied by adjusting the position of the guide vane 120.

The combination of the swirl generated by the two ports 140, 150 determines the mean swirl number of the intake channel 100.

FIGS. 4A and 4B schematically show the working principle of a guide vane 120. FIG. 4B shows the guide vane 120 positioned in the intake channel 100. The guide vane 120 modifies the flow distribution in the intake channel 100 by providing increased flow velocity near to the tangential port side 152.

The guide vane 120 may be sized such that it does not completely block any flow passageway formed in the intake channel 100 at any of its operating positions.

Guide vanes 120 may be provided in various different sizes and shapes in order to optimize the vane design to achieve the highest discharge coefficient and the highest swirl number variation. The dimensions and sizes of various guide vanes are specific to a particular application/engine design.

FIGS. 5A and 5B show a schematic of a further embodiment of the present invention comprising an adapter device 170 in both plan (FIG. 5A) and perspective (FIG. 5B) views. The adapter device 170 is coupled to a cylinder 200. The adapter device 170 also comprises a guide vane housing 180, which may be provided as a retro-fittable separate component part for fitting in a conventional engine.

The guide vane housing 180 provides an intake port inlet 130. Additionally, two guide vanes 120a, 120b are mounted in different positions within the intake port inlet 130 to vary the flow profile in an intake channel 100.

A first guide vane 120a is mounted in the guide vane housing 180 at a helical port side 142 thereof. A second, independently moveable, guide vane 120b is mounted at a raised position with respect to the first guide vane 120a in the guide vane housing 180 at a tangential port side 152 thereof. Together the two guide vanes 120a, 120b enable an enhanced set of flow velocity distributions to be provided within the intake channel 100.

Whilst various illustrated embodiments are shown with a single guide vane used therein, those skilled in the art will realise that more than one such guide vanes could be used and/or mounted closer to the intake valves. For example, an intake channel might comprise a first guide vane mounted at a helical port side of an intake channel and a second guide vane mounted at a tangential port side of the intake channel. Such guide vanes may be controlled either in tandem, or independently, as desired.

Various embodiments of the present invention may also take the form of an intake channel adapter device configured to fit, for example, between the engine manifold and the intake channel of the engine. For each cylinder, the intake channel adapter device may comprise a housing and an adjustable position guide vane. The guide vane may be configured to modify the velocity distribution of the flow within the intake channel so as to vary the mean swirl level in a cylinder of an engine. Such an adapter may be provided as a separate part that can be inserted, for example, between a conventional intake channel and the engine manifold of an engine.

Such an intake channel adapter device might also comprise a drive motor coupled to an actuator, which is operably connected to the guide vane positioned in the intake channel. The motor may have one or more connector leads for coupling the motor to an engine management electronic control unit (ECU). The intake channel adapter device might also be supplied in kit form, for example, along with software for providing an upgrade for an ECU in order to allow it to properly control at least one guide vane.

Additionally, it is to be understood that the intake channel may comprise a combination of two or more ports, which can be helical or tangential, depending on their shape. By varying the velocity distribution inside the intake channel it is possible to vary the mean swirl number in an internal combustion engine. Contrary to existing systems to vary the swirl in internal combustion engines, various embodiments of the present invention do not require the separation of both ports inside the intake channel by a wall in order to achieve a variation in the swirl.

Whilst the present invention has been described in accordance with various aspects and preferred embodiments, it is also to be understood that the scope of the invention is not considered to be limited solely thereto and that it is the Applicant's intention that all variants and equivalents thereof also fall within the scope of the appended claims.

What is claimed is:

1. An intake channel for an internal combustion engine, comprising:
    an inlet, a helical port distal from the inlet, a tangential port distal from the inlet, and a non-bifurcated portion downstream of the inlet; and
    an adjustable position guide vane positioned in the non-bifurcated portion of the intake channel and adjacent to at least one of an interior wall of the intake channel corresponding to a helical port side or a tangential port side of the intake channel, the guide vane being configured to modify a flow velocity distribution within the intake channel so as to vary the mean swirl level in a cylinder of an engine.

2. The intake channel of claim 1, wherein the guide vane is mounted proximal to the intake port inlet.

3. The intake channel of claim 1, wherein the guide vane is shaped to generate a non-uniform velocity profile within the intake channel when the guide vane is actuated.

4. The intake channel of claim 1, wherein the guide vane is mounted at the helical port side of the intake channel and is operable to produce a higher flow velocity at the tangential port side of the intake channel than at the helical port side.

5. The intake channel of claim 1, wherein the guide vane is sized such that the guide vane does not completely block any gas passageway formed in the intake channel at any position of the guide vane.

6. The intake channel of claim 1, comprising a plurality of guide vanes provided in the intake channel.

7. The intake channel of claim 6, wherein the guide vanes comprise a first guide vane mounted at the helical port side of the intake channel and a second guide vane mounted at the tangential port side of the intake channel.

8. The intake channel of claim 1, wherein one end of the guide vane is pivoted against the interior wall of the intake channel and the other end of the guide vane extends away from the interior wall and into the intake channel.

9. An intake channel adapter device configured to fit between an engine manifold and an intake channel of an engine, the intake channel adapter device comprising:
a guide vane housing having an inlet, a helical port distal from the inlet, a tangential port distal from the inlet, and a non-bifurcated portion downstream of the inlet; and
at least one adjustable position guide vane positioned in the non-bifurcated portion of the guide vane housing and adjacent to at least one of an interior wall of the guide vane housing corresponding to a helical port side or a tangential port side of the guide vane housing, the at least one adjustable position guide vane being configured to modify a flow velocity distribution within the intake channel so as to vary the mean swirl level in a cylinder of the engine.

10. The intake channel adapter device of claim 9, further comprising a drive motor coupled to the guide vane housing and operatively connected to the at least one adjustable position guide vane positioned in the guide vane housing, the motor having one or more connector leads for coupling the motor to an engine management electronic control unit (ECU).

11. The intake channel adapter device of claim 9, wherein the at least one adjustable position guide vane comprises a first guide vane provided at the helical port side of the intake channel, and a second guide vane provided at the tangential port side of the intake channel, the second guide vane being mounted at a raised position in the intake channel with respect to the first guide vane.

12. A method for varying the charge movement in an internal combustion engine, the method comprising adjusting the position of an adjustable position guide vane positioned in a non-bifurcated portion of an intake channel and adjacent to at least one of an interior wall of the intake channel corresponding to a helical port side or a tangential port side of the intake channel to modify a flow velocity distribution within the intake channel in order to vary the mean swirl level in one or more cylinders of an engine coupled to the intake channel.

13. The method of claim 12, wherein the intake channel defines a helical port and a tangential port distal from an intake port inlet, the intake port inlet being for receiving and directing the flow from a manifold of the engine into the helical port and the tangential port.

14. The method of claim 13, wherein the guide vane is mounted proximal to the intake port inlet.

15. The method of claim 12, comprising moving the guide vane so as to produce a higher flow velocity at the tangential port side of the intake channel than at the helical port side of the intake channel.

16. The method of claim 12, comprising moving a plurality of guide vanes provided in the intake channel to modify the mean swirl level in the one or more cylinders.

17. The method of claim 16, comprising moving a first guide vane mounted at the helical port side of the intake channel and independently moving a second guide vane mounted at the tangential port side of the intake channel to modify the mean swirl level in the one or more cylinders.

18. A method of varying the mean swirl number of an engine, comprising providing an adjustable position guide vane in a non-bifurcated portion of an intake channel that couples a cylinder head of the engine to a manifold of the engine, the guide vane being positioned adjacent to at least one of an interior wall of the intake channel corresponding to a helical port side or a tangential port side of the intake channel and configured to modify a gas velocity distribution within the intake channel so as to vary the mean swirl level in one or more engine cylinders.

19. The method of claim 18, comprising providing the guide vane proximal to an inlet of an intake port.

20. The method of claim 18, comprising providing a first guide vane at the helical port side of the intake channel and a second guide vane at the tangential port side of the intake channel.

* * * * *